United States Patent
Malcolm

(10) Patent No.: US 8,099,394 B2
(45) Date of Patent: Jan. 17, 2012

(54) PERSISTENT DATA STORAGE FOR DATA FILES OF APPLICATION DATA

(75) Inventor: Peter Bryan Malcolm, Okehampton (GB)

(73) Assignee: Computer Associates Think, Inc., Islandia, NY (US)

( * ) Notice: Subject to any disclaimer, the term of this patent is extended or adjusted under 35 U.S.C. 154(b) by 559 days.

(21) Appl. No.: 10/534,312

(22) PCT Filed: Aug. 18, 2004

(86) PCT No.: PCT/GB2004/003561
§ 371 (c)(1),
(2), (4) Date: May 1, 2006

(87) PCT Pub. No.: WO2005/020098
PCT Pub. Date: Mar. 3, 2005

(65) Prior Publication Data
US 2006/0200700 A1   Sep. 7, 2006

(30) Foreign Application Priority Data
Aug. 18, 2003  (GB) .................................. 0319393.5

(51) Int. Cl.
*G06F 17/30* (2006.01)
(52) U.S. Cl. ........................................ 707/661; 707/689
(58) Field of Classification Search .................. 707/661, 707/689
See application file for complete search history.

(56) References Cited

U.S. PATENT DOCUMENTS

| 4,310,883 A * | 1/1982 | Clifton et al. ................. 707/205 |
| 5,235,642 A | 8/1993 | Wobber et al. |
| 5,835,726 A | 11/1998 | Shwed et al. |
| 5,917,489 A * | 6/1999 | Thurlow et al. ............... 715/809 |
| 6,378,054 B1 | 4/2002 | Karasudani et al. |
| 6,882,795 B1 * | 4/2005 | McMurdie et al. ........... 386/125 |
| 2001/0006403 A1 * | 7/2001 | Crocitti et al. ................. 348/553 |
| 2002/0078077 A1 * | 6/2002 | Baumann et al. ............. 707/206 |
| 2002/0147734 A1 * | 10/2002 | Shoup et al. ................. 707/200 |
| 2002/0188592 A1 * | 12/2002 | Leonhardt et al. ................. 707/1 |
| 2003/0050729 A1 * | 3/2003 | Basham et al. ............... 700/214 |

(Continued)

FOREIGN PATENT DOCUMENTS
EP   0312865   4/1989

(Continued)

OTHER PUBLICATIONS

Definition of "application program", http://searchsoftwarequality.techtarget.com/sDefinition/0,,sid92_gci507192,00.html, 2007.*

(Continued)

*Primary Examiner* — Son T Hoang
(74) *Attorney, Agent, or Firm* — Baker Botts L.L.P.

(57) ABSTRACT

A system for efficiently storing application data which allows a practically infinite number of physically separate storage devices to be used as archival storage means by one or more application programs. Application data is organized among the devices such that files with a similar expiry date (that is the date beyond which the files are no longer required to be archived) are grouped together on the same physical device, such that after the expiry date the device used for such files may be erased and re-used. Optionally, files with particular content-types may be grouped on the same physical device, or among physical devices of the same type.

74 Claims, 6 Drawing Sheets

U.S. PATENT DOCUMENTS

| | | |
|---|---|---|
| 2003/0079084 A1* | 4/2003 | Gotoh et al. ............ 711/117 |
| 2003/0140282 A1 | 7/2003 | Kaler et al. |
| 2004/0167898 A1* | 8/2004 | Margolus et al. ............ 707/10 |

FOREIGN PATENT DOCUMENTS

| | | |
|---|---|---|
| EP | 0351109 | 1/1990 |
| EP | 1168176 | 1/2002 |
| GB | 2405495 B | 9/2006 |
| JP | 2003-006354 | 1/2003 |
| WO | WO-94/18634 | 8/1994 |
| WO | WO-02/101535 | 12/2002 |
| WO | WO-03/027891 | 4/2003 |

OTHER PUBLICATIONS

Sharick, P. "Expiration Dates and Retention Periods", Vax Professional, Jun. 1988.

Harding et al., "Object Storage Hierarchy Management", IMB Systems Journal, vol. 29, pp. 384-397 (1990).

Collins et al., "Los Alamos HPDS: High Speed Data Transfer", IEEE, pp. 111-118 (1993).

* cited by examiner

PERSISTENT DATA STORAGE FOR DATA FILES OF APPLICATION DATA

FIELD OF THE INVENTION

This invention relates to a data storage system and data storage method, and more particularly to the long term archiving of electronic communications and other documents.

BACKGROUND OF THE INVENTION

Recent increases in regulation, for example from bodies such as the Securities and Exchange Commission (SEC), National Association of Securities Dealers (NASD), their counterparts in other countries, and by legislation such as the Sarbanes-Oxley Act in the United States, have significantly increased the requirement to retain copies of electronic communications, such as electronic mail, instant messages, and other document types.

Coupled with the significant growth in the use of electronic communications and documents, the storage and management costs of retaining such data have escalated enormously, particularly for large organizations with many thousands of employees.

Recent studies show that a typical corporate employee currently handles around 7 megabytes of electronic mail per day. This number is forecast to increase to around 14 megabytes by 2007. Assuming an average 5 year retention requirement, this means that the storage needs of a 25,000 user organization could grow to over 300 terabytes, just for electronic mail.

In the past, much of the long term document retention needs of an organization have been satisfied using technologies such as magnetic tape and in some cases write-once optical devices. For many organizations however these are no longer viable options. This is because of an increasing need to be able to rapidly retrieve individual documents and to be able to search the content of all stored documents in a matter of seconds. Slow access times mean that this is impossible in the case of magnetic tape, and impractical in the case of optical devices which also suffer from relatively low capacity.

Currently, the only viable option is high capacity on-line data storage, which is produced by a relatively small number of large scale storage manufacturers, costing in the region of US$100,000 per terabyte. This is in sharp contrast to the 'commodity' end of the market where disk drive prices have fallen sharply while capacities have increased. A 30 gigabyte capacity hard disk can be purchased for as little as US$50, equivalent to around $1,700 per terabyte. One must, however, be cautious when making comparisons of this type, because large scale systems include infrastructure such as power supplies and controllers, and provide manageability and resilience, thus lowering the effective cost of ownership; however, such comparisons do illustrate the point that there is a wide pricing gap between the two.

The industry generally has also been slow to recognize that the requirements for long term on-line archival storage are fundamentally different to those of 'normal' on-line storage applications. In particular, in a traditional on-line storage environment, data 'read' activity generally exceeds 'write' activity by several, if not many, times. Consequently, on-line storage is usually optimized for reading, by the use of techniques such as caching.

In contrast, archiving, particularly of transient data such as email and instant messages, demands very high write performance in order to rapidly process the constant stream of incoming data—otherwise the messages have to either be delayed, or a temporary copy of them must be made, placing additional demands on the messaging system.

Storage technology has evolved considerably in recent years, with three new storage technologies emerging.

Network Attached Storage (NAS) couples one or more hard disk drives with a processor, memory and network connection to provide an inexpensive server dedicated to data storage, which can be accessed by any other networked system.

NAS has become a commodity item, available from a wide range of manufacturers at a cost below US$10,000 per terabyte. It has a relatively low capacity however, currently a maximum of 1 terabyte in a single physical device.

Storage Area Networking (SAN) adopts a different approach, providing a pool of physical storage devices connected by a dedicated high speed network. Application and file servers connect to this dedicated network and share the available storage pool, which can be easily expanded without needing to take servers off-line.

SAN is available from a number of manufacturers, but requires purpose designed high speed networking components, which increase its cost considerably over NAS. It supports a large pool of storage devices, but typically does not share logical storage volumes between servers.

Content Addressable Storage (CAS) is specifically designed for archiving static documents, ie those which do not change over their storage lifetime. Applications pass a copy of the document they want stored, and are returned a unique 'token' which the application uses to subsequently retrieve the document. CAS provides the advantage that multiple copies of the same document are automatically identified and only a single copy is stored.

Since CAS manages its own operating system its capacity is practically unlimited, but the requirement to calculate the unique token for every file written creates an overhead which limits write performance. In terms of capital cost however, CAS is currently at the top of the scale.

SUMMARY OF THE INVENTION

The invention is defined by the independent claims to which reference should now be made. Advantageous features are set forth in the dependent claims.

The preferred system provides a storage scheme for applications requiring persistent data storage, that is storage of data that once written is kept secure for an extended period of time until it is no longer required. This is in contrast to ordinary data storage in which it is assumed data read, write and erase operations are carried out more frequently.

The applications preferably operate on one or more computers connected by a computer network to one or more storage devices. The term computer is understood to mean a server, client or stand-alone machine.

The invention allows a practically infinite number of physically separate storage devices to be used as archival storage means by one or more application programs. Application data is organized among the devices such that files with a similar expiry date (that is the date beyond which the files are no longer required to be archived) are grouped together on the same physical device, such that after the expiry date the device used for such files may be erased and re-used. Optionally, files with particular content types may be grouped on the same physical device, or among physical devices of the same type.

The invention allows the storage system to start small, with perhaps only a few physical storage devices, and to be expanded by adding additional devices over time. This avoids a large initial capital outlay. Since the capacity of each physical device can be different, the invention allows the latest technology devices to be used whenever additional storage devices are added. This allows the most advantageous price/capacity ratio to be achieved.

The invention also provides means for load scalability, such that data may be read or written as multiple parallel streams between applications and devices providing practically unlimited performance, particularly in writing data to the storage means.

The result is a high capacity, high speed storage system able to meet the archiving needs of even the largest organizations, at a cost which is an order of magnitude less than current solutions, and which allows advances in storage technology to be taken full advantage of.

The invention also provides means for data to be secured, such that it cannot be deleted by an external process until its expiry data has been reached, an important requirement in regulatory environments.

BRIEF DESCRIPTION OF THE DRAWINGS

The invention will now be described in more detail, by way of example, and with reference to the drawings in which.

DETAILED DESCRIPTION OF THE PREFERRED EMBODIMENT

The preferred embodiment of the invention will now be described in more detail with reference to the drawings.

Figure 1:
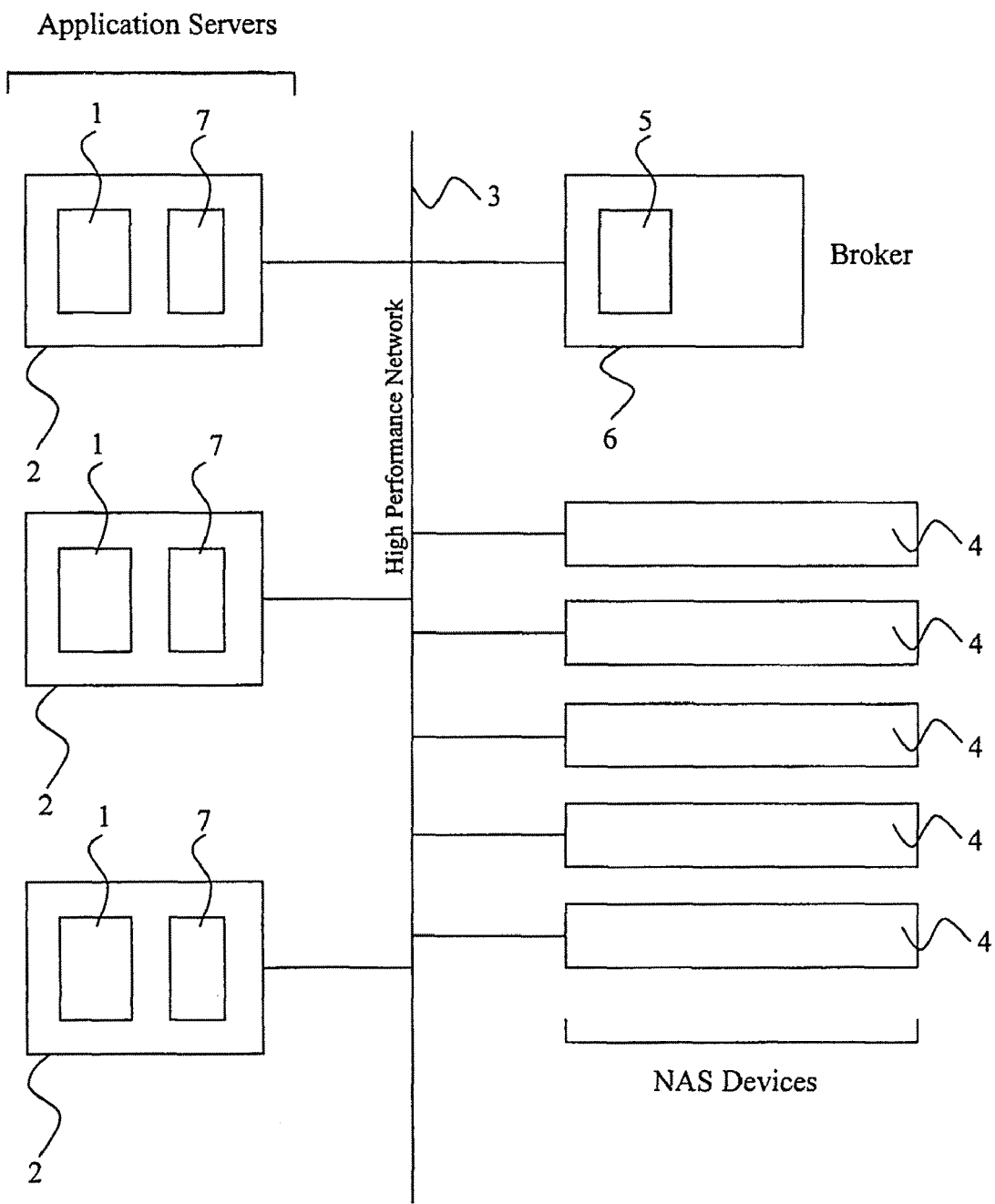
FIG. 1 is a schematic diagram showing the composition of the preferred embodiment of the invention.

FIG. 1 shows the components of the preferred embodiment and their connectivity. Application Programs 1 running on one or more computers 2, herein after called Application Servers, are connected via standard network components 3, preferably using switched gigabit Ethernet or a similarly high capacity technology, to a set of NAS devices 4 and to a Broker program or process 5 preferably running on a separate physical machine 6. Also provided are Agents 7 running on the Application Servers, which comprise executable code providing a standardized application programming interface (API) to allow the Application Programs to easily communicate with the Broker Application.

Figure 2:
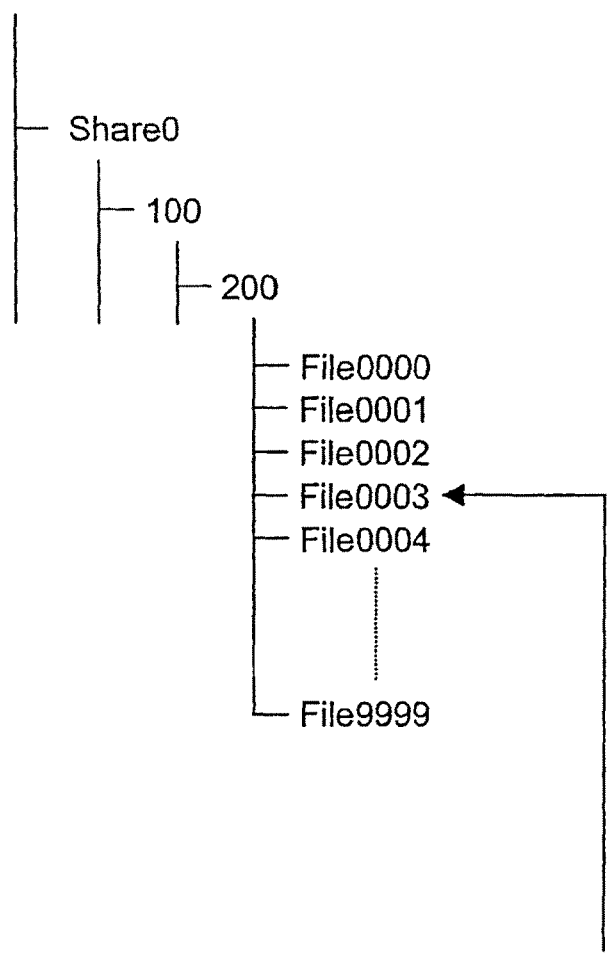
FIG. 2 shows the directory tree structure of one of the storage devices and a sample of the corresponding identifier for a given stored file.

Each NAS device is accessible to each of the Application Programs using standard file sharing methods, such as those under the usual UNC naming convention, each NAS device having a unique identifier by which it is addressed. As shown in FIG. 2, each NAS device has a conventional file system comprising a directory structure and files in the usual manner. FIG. 2 illustrates the directory structure of a NAS device having the unique identifier 001 (shown as 'NASDEV001'). Files named 'File0000' to 'File9999' are stored in directory 200, which is itself a subdirectory of directory 100. Finally, directory 100 is contained within the top-level directory 'Share0'. By way of illustration the path name to one of the files (File 0003) is also shown: '\\NASDEV001\Share0\100\200\File0003'.

Arranging files in directories and subdirectories is preferred, as it makes looking-up any given file more efficient. This is pertinent in the case of the preferred system, where reading and writing data speeds should be optimised.

The security provisions for ensuring controlled access to data may be provided by means of the usual username/password authentication, and/or by making the network 3 a private network accessible only to the Application Servers and allowing the Application Programs to control access. Such security provisions are assumed to be known and so will not be discussed further.

Figure 3:
FIG. 3 shows a sample of a device table maintained by the Broker process.

The Broker Application maintains a Device table with each row of the table corresponding to a single NAS device, and each column corresponding to various configuration and status conditions of the NAS devices. FIG. 3 shows an example implementation of the Device table maintained by the Broker 5.

The first column 31 contains a Device ID such that each storage device can be separately and uniquely referenced.

The next column 32 indicates the current status of each of the respective devices. The status may be 'Full', indicating that the storage capacity of the device has been entirely used up; 'In Use' meaning that data has been written to the device but that storage space remains; 'Off-Line' meaning that the device has been temporarily or permanently disconnected and is not presently available to receive data; and 'Free' which indicates that the device is empty and can be written to.

The Broker manages the device table such that all 'Free' devices appear after devices with another status. This includes devices which are being 'recycled' after erasure of the data they contain and which is no longer needed. Thus, when all of the data in a 'Full' device is past its expiry date, the device status will be set to 'Free' and its entry in the Device table will be relocated to the bottom of the table. The data can be erased and the device made ready to receive new data.

The next column 33, in the table indicates a 'Content Type' for the data that is stored in the device. When an Application Program requests write permission from one of the storage devices, it will indicate to the Broker process the content type of the data to be stored. The application Program therefore sets the content type for the data. The content types themselves may however be defined by a user or system administrator to reflect the types of data that are required to be stored. The content type '1' illustrated in FIG. 3, may for example, indicate 'e-mail' data, and '2' may indicate word processor files, or html pages. Content type codes may also be used to subdivide data of a given type, such as word processor files for examples, by importance. The code '3' for example may indicate word processor files that are of particular importance, and should be saved for a longer period of time than regular word processor files.

Preferably, each device stores only one type of data content as this makes the recycling of the device more straightforward, and operation of the preferred system more efficient. However, it is also possible that different regions of the same device are used independently to store different respective content types.

The next column 34 in the Device table, entitled 'Target Expiry Date', records the date on which it is anticipated that erasure of the contents of the device, and reclamation of the storage space will take place. This date is preferably set by the user or system administrator of the storage system, as a means of exercising control over the storage of the data in the respective storage devices. Depending on the implementation chosen, the target expiry date may be a fixed, inflexible date, such that data which is required to be stored until after the target expiry date is not allowed to be stored in the respective device. Alternatively, it could be a flexible date in which case data that is required to be stored until after the target expiry date is allowed to be stored, providing the date until which it is required falls within a predetermined margin of the target date.

The 'Actual Expiry Date', shown in column 35, on the other hand, reflects the latest date until which an item of data is to be stored. If data is subsequently received that must be stored until a later date than the indicated 'Actual Expiry Date', the Actual Expiry Date is updated.

The next column 36, entitled 'Kilobytes Waiting' indicates how much data allocated to a particular storage device has yet to be physically written to the device. As there is a finite rate at which data can be written to each device (currently 5 Mb per second for a typical NAS device), it is necessary to monitor the data feed to try and avoid any particular device being overloaded.

The column 37 entitled 'Kilobytes Free' records how much remaining device space there is to store data, and lastly the column 38 entitled 'Current File' indicates the current file number. As illustrated in FIG. 2, this preferably ranges from 0 to 9999 and will be incremented by 1 each time a new file is written. Other naming conventions, or ranges of numbers are also possible.

Figure 4:
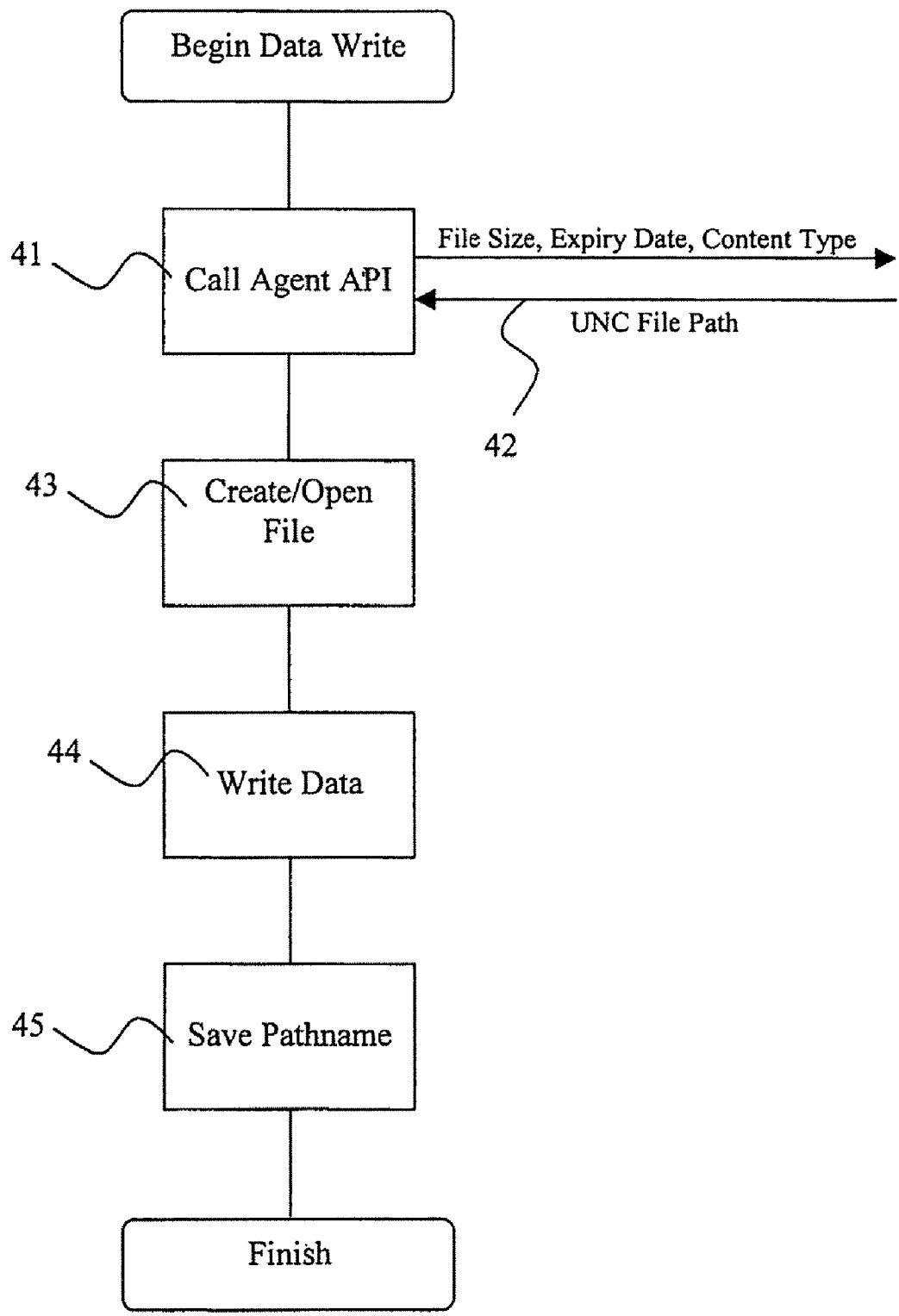
FIG. 4 is a flowchart showing the procedure for writing data to the storage means.

There now follows a description of how data is stored and retrieved by the preferred system:

FIG. 4 shows a flowchart of the data write process. When an Application Program 1 requires that a file be written to the storage means, it first makes a call, Step 41, to the Broker Application, via the Agent API 7. In making this call it preferably passes three parameters; the length of the file to be stored, the expiration date beyond which the file will no longer be required, namely 'The Actual Expiry Date' (or a null date indicating that the file is to be kept forever), and an indication of data or content type. This third parameter may be optional.

The Broker returns (Step 42) either a fully qualified pathname or a set of identifiers from which the fully qualified pathname can be constructed. According to the implementation, the file can be created (that is an entry made in the appropriate directory on the appropriate device) by the Broker and then subsequently opened by the Application Program, or the file can be created and opened (Step 43) by the Application Program itself (as shown in FIG. 4). The Application Program then immediately writes the data file to the said location (Step 44). The Application Program then stores (Step 45) either the fully qualified pathname or the identifiers which are used to construct it, such that the file can be read back at a later stage.

Figure 5:
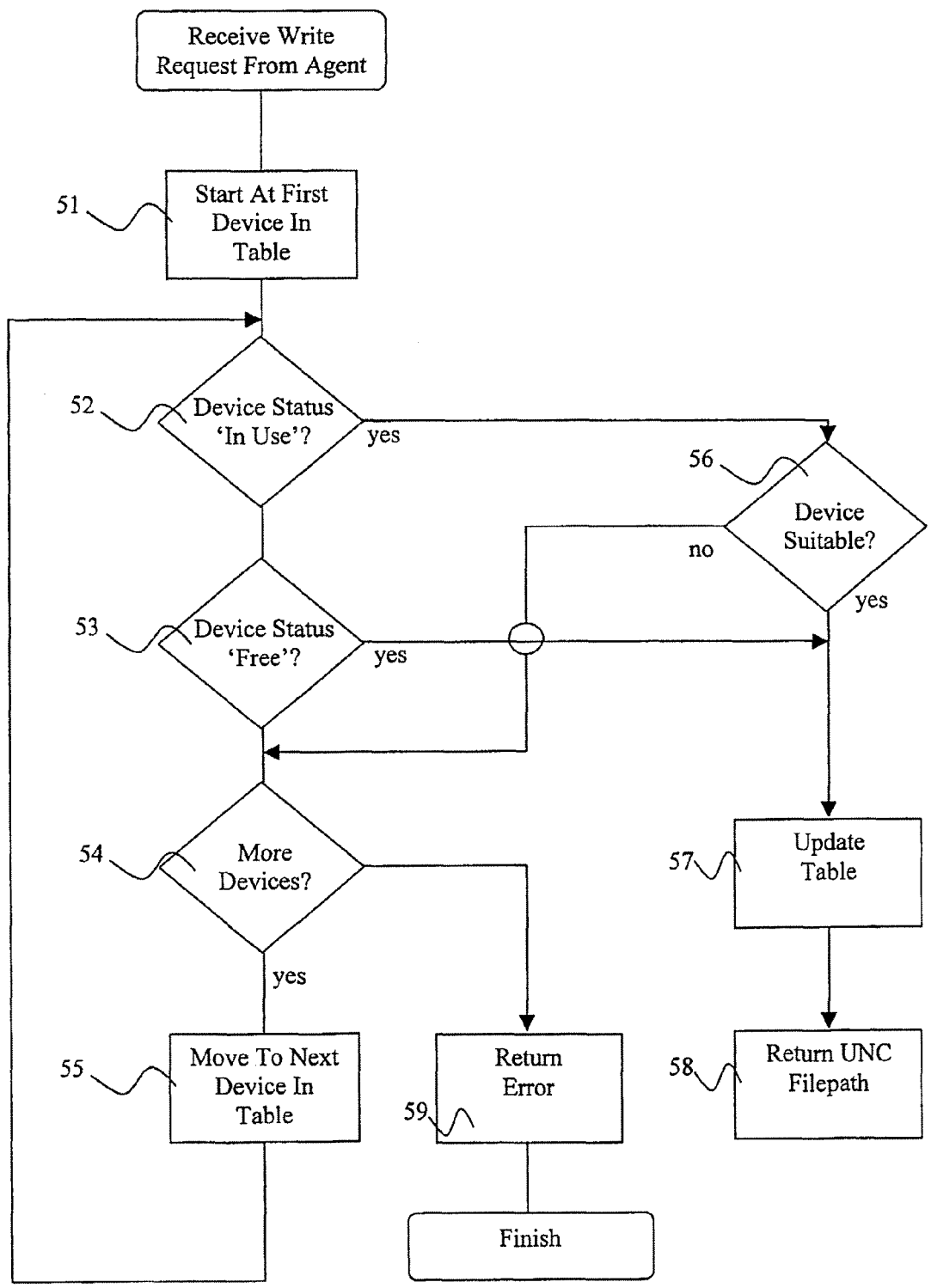
FIG. 5 is a flowchart showing how the selection of storage device is determined.

FIG. 5 shows a flowchart of the process the Broker uses to determine which device a given file should be written to. On receipt of a request from an Agent (step 41 in FIG. 4), the Broker consults (Step 51) its Device table (such as shown in FIG. 3) starting with the first device in the table. The Broker first determines at Step 52 if the device has an 'In Use' status, that is it is available for the storage of new files. If it has this status then control passes to step 56 where the Broker determines if the current operating parameters are suitable to allow the file to be stored.

In making this determination, the Broker considers a number of factors. Firstly, that the intended content type of the data (passed as a parameter by the Agent) matches that of the device in the table. As mentioned earlier, the necessity for the data content type to match that of the device can be waived depending on the implementation. Secondly, that the device has enough free space to hold the file (the file size being passed by the Agent as a parameter, and the table containing the current amount of free space on the device). Thirdly that the target expiry date of the device is within a given time period of the required expiry date (passed as a parameter by the agent). Lastly that the amount of data waiting to be written to the device does not exceed a given threshold representing an overload condition of the device.

The content type is entirely determined by the Application Program. It is used to group content of a certain type together. This might, for example, be used to keep mail from different departments on different devices. The content type field could also be used for other purposes, for example to differentiate different types of device, allowing more important files to be stored on more resilient storage devices, for example keeping customer communications on devices with mirrored disk drives.

Various algorithms can be used in considering whether storage of data with a given required expiry date or a given device is acceptable. At its most simple, the target date can be a hard expiry date set in advance by the system administrator, such that if the required expiry date occurs at any time after the target date then the device is considered unsuitable for the data. Alternatively, an algorithm can determine that the data will be accepted by the device if the required expiry date is not more than, say, 3 months beyond the target expiry date.

Most advantageously, the algorithm considers multiple factors, including the amount of free space on the device, and the rate at which it is filling with data (and hence the date it is likely to become full). The objective is to fill a given device with data files which have the earliest possible expiry date, such that the device may be eligible for re-use as soon as possible, and without wasting space.

The overload threshold amount is typically the amount of data that the device is able to process in a given time period. The frequency with which the 'Kilobytes waiting' field 36 is updated preferably matches this time period. A suitable allowance can be made for read activity; for example the threshold might be reduced to 80% of the device's throughput capacity.

If it is determined that the current operating parameters of the device are suitable to allow the data to be stored, then control passes to step 57, where the device table is updated as follows. If the required expiry date of the data being stored is later than the actual expiry date in the table, then the actual expiry date is replaced by it. The field containing the amount of data waiting to be written is increased by the size of the file to be written (passed as a parameter by the Agent). The field containing the amount of free space on the disk is reduced by the size of the file to be written. For this purpose, the size of the file to be written may be rounded up to a multiple of the device's disk allocation unit size in order to maintain a more accurate free space count. The current file number is then incremented.

The incremented file number is then used to construct a UNC file path, and this is returned to the Agent in step 58. It will be appreciated that while the table in FIG. 3 shows a simple current file number, this could be used to construct a more complex path such as that described with reference to FIG. 2. The purpose of a more complex path is to limit the number of files in a given directory, since most operating systems become less efficient as the number of directory entries in a given directory increases. If new directories need to be created, then this can be done by the Broker at this stage.

If, in Step 56, the device is not found to be suitable, such as if the Content Type does not match, insufficient storage space remains, or if allocating the data to the device will result in an overload condition, then control passes to Step 54, where a check for an alternative storage device is made. Assuming there is another device, control passes to step 55 in which the next device in the device table is considered. The status of that device is then determined as before in Steps 52 to 54. A device pointer may be used in Steps 51 to 55 in conjunction with the device identifiers shown in column 31 to monitor the current device under consideration.

If no alternative device is found in step 54, then control passes to step 59 where an error is returned to the Agent since no suitable device can be found on which to store the file.

If in Step 52, the device is not found to have an 'In-Use' status, then control passes to Step 53, where a check is made to see if the device is 'Free'.

If the device has a status of 'Free' then the table update in Step 57 is as follows. The status is changed from 'Free' to 'In-Use'. The content type is set to the requested content type (passed by the Agent as a parameter). The target expiry date is set either to the requested expiry date (passed by the Agent), or by some suitable algorithm to a date beyond it. The amount of data waiting is set to the size of the file to be written (again passed by the Agent), and the current file number is set to 1. If the amount of free space on the drive has not already been set, then it is determined by the Broker and set in the table accordingly.

Control then passes to step 58 where the current file number is used to construct and return the UNC pathname as before.

As explained earlier, the Broker Application maintains the device Table such that devices with status 'Free' are added to the bottom of the table. This ensures that suitable devices which are already 'in-use' are used in preference to new, empty devices. This ensures that the available storage space is used efficiently.

If the device status is not determined as 'Free' in step 53, then control passes to step 54 where it is determined if there are any more devices in the table. If not, then control passes to step 59 where an error is returned to the Agent since no suitable device can be found on which to store the file.

In the case of a device being rejected because of an overload condition in the Kilobytes waiting column, the Broker may retry the overloaded device again after a predetermined delay to see if it has become available before issuing an error. An appropriate notification may be given to the Application Program that requested write permission while this is occurring.

Otherwise, the device pointer is incremented (step 55) and control passes back to step 52, where the next device in the table is considered.

It will be appreciated that new devices can be added to the system at any time by extending the Device table, adding an entry for the new device at the end of it, and setting the status for that device to 'Free'. The Broker 5 can be implemented to periodically check for new devices and update the device table automatically.

Another process that must be carried out by the Broker application is to periodically reduce the field containing the amount of data waiting to be written to each device by the amount of data that can be written in such period. For example, if a given device is capable of accepting data at a rate of 5 megabytes per second (a typical performance rate) then the table can be updated once every second, reducing the amount in the data waiting field by 5 megabytes. If this causes the data waiting amount to be negative, then it is set to zero as all data waiting will have been written. It will be appreciated that the update period and adjustment amount can be proportionately varied.

Because each hardware component in the preferred embodiment is connected via a network switch, multiple Application Programs each have a full capacity connection to each Storage device. Since the Broker avoids overloading a device by moving write activity to another device, performance of the overall system can scale to much higher levels than with a single connection storage sub-system.

The Broker can also be configured to remove write and/or delete access to each file after a given time interval. For example, 5 seconds after the Broker passes the UNC pathname back to the Agent it can change access control to the file on the device such that it is write protected and cannot be deleted by any other process. This is achieved using a call to a standard operating system function on the device. While 5 seconds will likely be sufficient time for the Application to open the file and begin writing data to it, in the case of a large file the Application Program may not have completed the task. However in the case of typical operating systems this does not cause a problem, since access rights are only checked at the time a file is opened. Alternatively, the Broker can periodically check that the file has been created, written to, and closed before changing the access rights.

This method of locking the file ensures that it cannot be accidentally deleted by any process other than by the Broker, which is configured not to do so until the expiry date for each file has been reached, when the Broker can either remove the deletion protection, or optionally delete the file itself. Thus the system effectively becomes a write once, read many (WORM) device, at least until the expiry date of each file, and as such meets both the regulatory requirements for storage compliance (such as SEC and NASD rules) and the organization's need to free storage for re-use as soon as possible.

Figure 6:
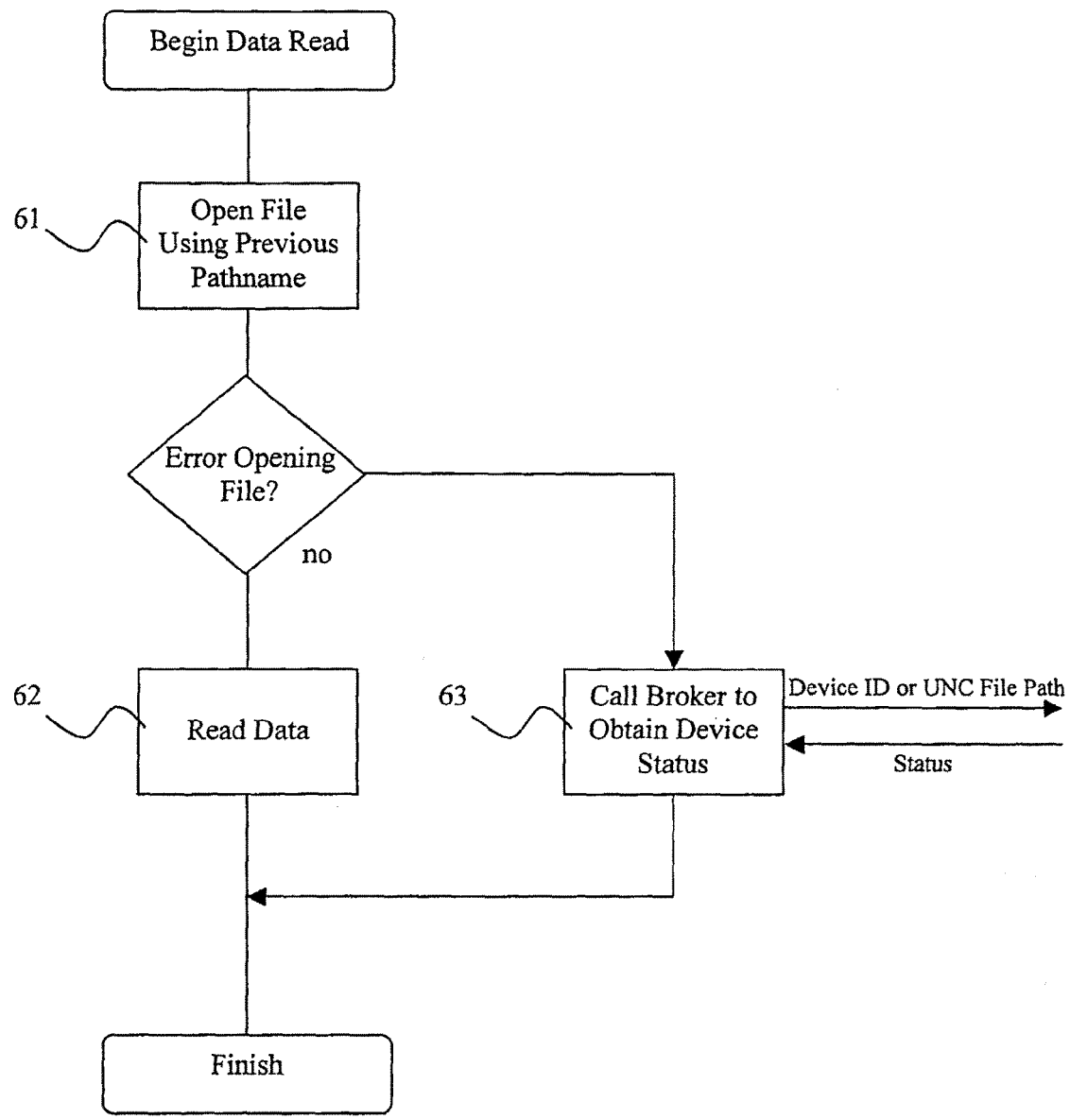
FIG. 6 is a flowchart showing the procedure for reading data from the storage means.

FIG. 6 shows a flowchart of the data read process. When an Application Program needs to read data from a file it simply opens it Step 61 using the fully qualified pathname it stored at step 45 during the write process, constructing the pathname from the set of identifiers if necessary. The Application Program then reads the data directly from the file, step 62. In the event the Application Program receives an error opening the file, for example if the file has been deleted after its expiry date, then it can consult the Broker Step 63 to determine the status of the device and the cause of the error.

Although the preferred embodiment of the invention has been described as comprising a number of NAS devices, it will be appreciated that any suitable storage devices, or combination of storage devices, could also be used.

The invention claimed is:

1. A method of operating a data processing system, the system comprising application programs requiring persistent data storage for data files of application data, a plurality of physical storage devices each accessible via a computer network to one or more computers executing the application programs, and a broker program, wherein the method comprises:

receiving, by the broker program, a request from an application program for storage of a data file of application data of the application program, the request including an expiry date set by the application program, beyond which the data file is no longer required and will be deleted;

selecting, by the broker program, a first physical storage device of the plurality of physical storage devices to store the data file according to the expiry date of the data file and a state of the first physical storage device by:

affirming that the expiry date of the data file occurs before a device expiry date associated with the first physical storage device;

affirming that the expiry date of the data file occurs within a predetermined range of the device expiry date; and preventing, by the broker program, the data file from being deleted until the expiry date of the data file has been reached;

wherein the selecting step comprises:

monitoring, using the broker program, remaining storage space available on each of the storage devices, to distinguish between in-use storage devices which have had data files written thereon and empty storage devices which have not had data files written thereon; and choosing the in-use storage devices in preference over the empty storage devices.

2. The method according to claim 1, further comprising:

monitoring how much data is waiting to be written to each of the storage devices, to detect an overload condition in writing the data; and selecting, when the overload condition is detected for a storage device selected for storage, a different storage device for storage.

3. The method according to claim 1, further comprising:

storing, for each storage device, latest expiry date of data files stored on corresponding storage device, or of data files that are to be stored on the corresponding storage device; and permitting the application data to be stored on a storage device when its corresponding expiry date associated with the application data is within a predetermined range occurring after the latest expiry date.

4. The method according to claim 3, further comprising selecting another storage device for storage, when the expiry date of the application data is outside of the predetermined range of the latest expiry date.

5. The method according to claim 3, further comprising, after the latest expiry date has passed, erasing contents of the storage device.

6. The method according to claim 1, further comprising storing for each of the storage devices a target expiry date, and selecting which of the storage devices to use in dependence on a comparison of the expiry date and the target expiry date.

7. The method according to claim 6, further comprising preventing the application data from being stored on a storage device, when the target expiry date for that storage device is earlier than the expiry date.

8. The method according to claim 6, further comprising preventing application data from being stored on a storage device when the target expiry date for that storage device is earlier than the expiry date by more than a predetermined margin.

9. The method according to claim 1, further comprising, after the data file has been written to the first physical storage device, preventing the file from being modified or deleted until the expiry date has passed.

10. The method according to claim 1, wherein characteristics of the data to be stored include a classification of content of the application data.

11. The method according to claim 10, further comprising:

storing, for each of the storage devices, a target content type;

comparing the classification of the content of the application data and the target content type; and preventing the application data from being stored in a storage device when the target content type for that device and the classification do not match.

12. The method according to claim 1, wherein characteristics of the data to be stored include the application program which requires its storage.

13. The method according to claim 1, wherein characteristics of the data to be stored include size of the application data.

14. The method according to claim 1, comprising writing the application data to and/or reading the application data from the storage devices directly using the application programs via the computer network.

15. The method according to claim 1, further comprising notifying the application program of the first physical storage device used to store the data file as determined by the broker program, such that the application program can store means to identify the first physical storage device.

16. The method according to claim 15, wherein the data files are retrieved from the first physical storage device by the application program directly via the computer network and without reference to the broker program.

17. The method according to claim 1, further comprising determining, using the broker program, directory location for storage of the data file on the storage devices.

18. The method according to claim 17, further comprising creating, using the broker program, directory entry for the data file in the directory location in anticipation of data being written to the data file by the application program requesting storage.

19. The method according to claim 17, further comprising notifying, using the broker program, the directory location of the data file to the application program for storage by the application program.

20. The method according to claim 17, wherein directory entry for the data file in the directory location is created by the application program prior to data being written by the application program.

21. The method according to claim 1, wherein states of the storage devices include current availability of such devices for data to be written thereto.

22. The method according to claim 1, wherein states of the storage devices include amount of free space available in the storage devices.

23. The method according to claim 1, wherein states of the storage devices include rate at which data is being read from and/or written to such storage devices.

24. The method according to claim 1, further comprising monitoring status of the storage devices, detecting when new storage devices have been added, and making these newly added storage devices available for storage.

25. The method according to claim 1, wherein the selecting step is based on an amount of free space available in the storage devices so that the selected physical storage device is filled and eligible for re-use as soon as possible.

26. A system for storing data comprising:

a plurality of physical storage devices;

a computer processor in communication with the plurality of physical storage devices, wherein the computer processor is configured for:

receiving a request for storage of a data file of application data from one or more application programs requiring persistent data storage, the request including an expiry date set by the application program, beyond which the data file is no longer required and will be deleted; and selecting a first physical storage device of the plurality of physical storage devices to store the data file according to the expiry date of the data file and a state of the physical storage device, such that the data file is stored in the selected first physical storage device, by:
    affirming that the expiry date of the data file occurs before a device expiry date associated with the first physical storage device;
    affirming that the expiry date of the data file occurs within a predetermined range of the device expiry date; and
preventing the data file from being deleted until the expiry date of the data file has been reached;
wherein the selecting step comprises:
    utilizing a look-up table accessible by the computer processor to monitor remaining storage space available on each of the storage devices such that in-use storage devices which have had data files written thereon and empty storage devices which have not had data files written thereon are distinguished from each other; and
    choosing the in-use storage devices in preference over the empty storage devices.

27. The system according to claim 26, wherein the look-up table stores how much data is waiting to be written to each of the storage devices, such that an overload condition in writing the data to a storage device can be detected; wherein the computer processor is further configured to select, when the overload condition is detected for a storage device selected for storage, a different storage device for storage.

28. The system according to claim 26, wherein the look-up table further stores, for each storage device, latest expiry date of data files stored on corresponding storage device, or of data files that are to be stored on the corresponding storage device, and wherein the computer processor is configured to permit the application data to be stored on a storage device when its corresponding expiry date is within a predetermined range occurring after the latest expiry date.

29. The system according to claim 28, wherein the computer processor is configured to select another storage device for storage, when the expiry date of the application data is outside of the pre-determined range of the latest expiry date.

30. The system according to claim 28, wherein the computer processor is further configured to erase, after the latest expiry date has passed, contents of the storage device.

31. The system according to claim 26, wherein the look-up table further stores, for each storage device a target expiry date, and the computer processor is further configured to select which of the storage devices to use in dependence on a comparison of the expiry date and the target expiry date.

32. The system according to claim 31, wherein the computer processor is further configured to prevent the application data from being stored on a storage device, when the target expiry date for that storage device is earlier than the expiry date.

33. The system according to claim 31, wherein the computer processor is further configured to prevent the application data from being stored on a storage device when the target expiry date for that storage device is earlier than the expiry date by more than a predetermined margin.

34. The system according to claim 26, wherein the computer processor is further configured to prevent, after the data file has been written to the first physical storage device, the file from being modified or deleted until the expiry date has passed.

35. The system according to claim 26, wherein characteristics of the data to be stored include a classification of content of the application data.

36. The system according to claim 35, wherein the look-up table further stores a target content type; and wherein the computer processor is further configured to compare the classification of the content of the application data and the target content type, and prevent the application data from being stored in a storage device when the target content type for that device and the classification do not match.

37. The system according to claim 26, wherein characteristics of the data to be stored include the application program which requires its storage.

38. The system according to claim 26, wherein characteristics of the data to be stored include size of the application data.

39. The system according to claim 26, wherein the computer processor is further configured to notify the application program of the first physical storage device used to store the data file as determined by the computer processor, such that the application program can store means to identify the first physical storage device.

40. The system according to claim 26, wherein the computer processor is further configured to determine directory location for storage of the data file on the storage devices.

41. The system according to claim 40, wherein the computer processor is further configured to notify the directory location of the data file to the application program for storage by the application program.

42. The system according to claim 26, wherein states of the storage devices include current availability of such devices for data to be written thereto.

43. The system according to claim 26, wherein states of the storage devices include amount of free space available in the storage devices.

44. The system according to claim 26, wherein states of the storage devices include rate at which data is being read from and/or written to such storage devices.

45. The system according to claim 26, wherein the computer processor is further configured to monitor status of the storage devices, detect when new storage devices have been added, and make these newly added storage devices available for storage.

46. The system according to claim 26, wherein the selecting step executed by the computer processor is based on an amount of free space available in the storage devices so that the selected physical storage device is filled and eligible for re-use as soon as possible.

47. A system for storing data, comprising:
    one or more application programs requiring persistent data storage for data files of application data;
    a plurality of physical storage devices each accessible via a computer network to one or more computers executing the one or more application programs; and
    a broker program, executable by the one or more computers, configurable for:
        receiving a request from an application program for storage of a data file of application data of the application program, the request including an expiry date set by the application program, beyond which the data file is no longer required and will be deleted;
        selecting a first physical storage device of the plurality of physical storage devices to store the data file according to the expiry date of the data file and a state of the first physical storage device by:

affirming that the expiry date of the data file occurs before a device expiry date associated with the first physical storage device;

affirming that the expiry date of the data file occurs within a predetermined range of the device expiry date; and preventing the data file from being deleted until the expiry date of the data file has been reached;

wherein the selecting step comprises:

monitoring, using the broker program, remaining storage space available on each of the storage devices, to distinguish between in-use storage devices which have had data files written thereon and empty storage devices which have not had data files written thereon; and choosing the in-use storage devices in preference over the empty storage devices.

48. The system according to claim 47, comprising an Application Program Interface running on the one or more computers to pass commands to and from the broker program and the application program.

49. The system according to claim 47, wherein the selecting step executed by the broker program is based on an amount of free space available in the storage devices so that the selected physical storage device is filled and eligible for re-use as soon as possible.

50. The computer program product for controlling a computer in a data storage system, the computer being operable to receive requests from one or more application programs, running on one or more computers, and requiring persistent data storage for data files of application data, and operable to monitor a plurality of physical storage devices, the computer program product comprising:

a recording medium readable by the computer, having program code stored thereon which when executed on the computer configures the computer to perform steps of:

receiving a request for storage of a data file of application data from an application program, the request including an expiry date set by the application program, beyond which the data file is no longer required and will be deleted;

selecting a first physical storage device of the plurality of physical storage devices to store the data file according to the expiry date of the data file and a state of the first physical storage device by:

affirming that the expiry date of the data file occurs before a device expiry date associated with the first physical storage device;

affirming that the expiry date of the data file occurs within a predetermined range of the device expiry date; and preventing the data file from being deleted until the expiry date of the data file has been reached;

wherein the selecting step comprises:

monitoring remaining storage space available on each of the storage devices, to distinguish between in-use storage devices which have had data files written thereon and empty storage devices which have not had data files written thereon; and choosing the in-use storage devices in preference over the empty storage devices.

51. The computer program product according to claim 50, which when executed on the computer further configures the computer to monitor how much data is waiting to be written to each of the storage devices, to detect an overload condition in writing the data; and select, when an overload condition is detected for a storage device selected for storage, a different storage device for storage.

52. The computer program product according to claim 50, further comprising storing for each of the storage devices a target expiry date, and selecting which of the storage devices to use in dependence on a comparison of the expiry date and the target expiry date.

53. The computer program product according to claim 52, which when executed on the computer further configures the computer to prevent application data from being stored on a storage device, when the target expiry date for that storage device is earlier than the expiry date.

54. The computer program product according to claim 52, which when executed on the computer further configures the computer to prevent application data from being stored on a storage device when the target expiry date for that storage device is earlier than the expiry date by more than a predetermined margin.

55. The computer program product according to claim 51, which when executed on the computer further configures the computer to prevent, after the data file has been written to the storage device, the file from being modified or deleted until the expiry date has passed.

56. The computer program product according to claim 50, which when executed on the computer further configures the computer to: store, for each storage device, latest expiry date of data files stored on corresponding storage device, or of data files that are to be stored on the corresponding storage device; and permit the application data to be stored on a storage device when its corresponding expiry date associated with the application data is within a predetermined range occurring after the latest expiry date.

57. The computer program product according to claim 56, which when executed on the computer further configures the computer to: select another storage device for storage, when the expiry date of the application data is outside of the predetermined range of the latest expiry date.

58. The computer program product according to claim 56, which when executed on the computer further configures the computer to erase contents of the storage device, after the latest expiry date has passed.

59. The computer program product according to claim 50, wherein characteristics of the data to be stored include a classification of content of the application data.

60. The computer program product according to claim 59, which when executed on the computer further configures the computer to:

store for each of the storage devices, a target content type; compare the classification of the content of the application data and the target content type; and prevent the application data from being stored in a storage device when the target content type for that device and the classification do not match.

61. The computer program product according to claim 50, wherein characteristics of the data to be stored include the application program which requires its storage.

62. The computer program product according to claim 50, wherein characteristics of the data to be stored include size of the application data.

63. The computer program product according to claim 50, which when executed on the computer further configures the computer to notify the application program of the first physical storage device used to store the data file as determined by the broker program, such that the application program can store means to identify the first physical storage device.

64. The computer program product according to claim 50, which when executed on the computer further configures the computer to determine directory location for storage of the data file on the storage devices.

65. The computer program product according to claim 64, which when executed on the computer further configures the computer to notify the directory location of the data file to the application program for storage by the application program.

66. The computer program product according to claim 50, wherein states of the storage devices include current availability of such devices for data to be written thereto.

67. The computer program product according to claim 50, wherein states of the storage devices include amount of free space available in the storage devices.

68. The computer program product according to claim 50, wherein states of the storage devices include rate at which data is being read from and/or written to such storage devices.

69. The computer program product according to claim 50, which when executed on the computer further configures the computer to monitor the status of the storage devices, detects when new storage devices have been added, and makes these newly added storage devices available for storage.

70. The computer program product according to claim 50, the selecting step is based on an amount of free space available in the storage devices so that the selected physical storage device is filled and eligible for re-use as soon as possible.

71. A computer program product for controlling a computer in a data storage system, the computer program product comprising a recording medium readable by the computer, having program code stored thereon executable by the computer and configures the computer to perform steps of:
receiving a request from an application program, among one or more application programs, for storage of a data file of application data of the application program, the request including an expiry date set by the application program, beyond which the data file is no longer required and will be deleted;
determining one or more characteristics of the application data, including the expiry date;
monitoring status of storage devices in a plurality of physical storage devices;
selecting a first physical storage device from the plurality of physical storage devices to store the data file of the application data according to the expiry date of the data file and a state of the first physical storage device, wherein the data file is stored on the selected first physical storage device, by:
affirming that the expiry date of the data file occurs before a device expiry date associated with the first physical storage device;
affirming that the expiry date of the data file occurs within a predetermined range of the device expiry date; and
preventing the data file from being deleted until the expiry date of the data file has been reached;
wherein the selecting step comprises:
monitoring remaining storage space available on each of the storage devices, to distinguish between in-use storage devices which have had data files written thereon and empty storage devices which have not had data files written thereon; and
choosing the in-use storage devices in preference over the empty storage devices.

72. The computer program product according to claim 71, wherein the selecting step is based on an amount of free space available in the storage devices so that the selected physical storage device is filled and eligible for re-use as soon as possible.

73. A method of operating a data processing system to store data, comprising:
receiving a request from an application program, among one or more application programs, for storage of a data file of application data of the application program, the request including an expiry date set by the application program, beyond which the data file is no longer required and will be deleted;
determining one or more characteristics of the application data file, including the expiry date;
monitoring status of storage devices in a plurality of physical storage devices; and
selecting a physical storage device from the plurality of physical storage devices to store the data file according to the expiry date of the data file and a state of the physical storage device, wherein the data file is stored on the selected physical storage device, by:
affirming that the expiry date of the data file occurs before a device expiry date associated with the physical storage device;
affirming that the expiry date of the data file occurs within a predetermined range of the device expiry date; and
preventing the data file from being deleted until the expiry date of the data file has been reached;
wherein the selecting step comprises:
monitoring remaining storage space available on each of the storage devices, to distinguish between in-use storage devices which have had data files written thereon and empty storage devices which have not had data files written thereon; and
choosing the in-use storage devices in preference over the empty storage devices.

74. The method according to claim 73, wherein the selecting step is based on an amount of free space available in the storage devices so that the selected physical storage device is filled and eligible for re-use as soon as possible.

* * * * *